United States Patent Office 3,639,389
Patented Feb. 1, 1972

3,639,389
LOW D.E. STARCH HYDROLYSATE DERIVATIVES
Glenn Arden Hull, Oak Park, Ill., assignor to
CPC International Inc.
No Drawing. Filed May 15, 1968, Ser. No. 729,399
Int. Cl. C08b 19/01
U.S. Cl. 260—233.3 R
4 Claims

ABSTRACT OF THE DISCLOSURE

Covers derivatives of low D.E. starch hydrolysates, including those of the cationic, anionic and non-ionic types. Also, covers prevention of haze formation in highly concentrated low D.E. starch hydrolysate syrups by having present therein the above derivatives.

---

Up until recently low D.E. starch hydrolysates, that is starch hydrolysates only being hydrolyzed to a relatively low degree, have not been available, particularly from a commercial standpoint. Only in the past few years have there been developed methods of producing this class of starch materials in a practical and economical way. Due to their low level of sweetness, these particular materials are especially useful as bulking agents, such as carriers for synthetic sweeteners. They are also useful for a wide variety of other applications.

Likewise, derivatives of these same materials have not been made, particularly derivatives of starch hydrolysates having a D.E. less than about 30, say within the range of 5-20. It is the purpose of this invention to provide derivatives useful in the same manner as are the parent low D.E. starch hydrolysates. The derivatives are also useful for a variety of other applications as enumerated below.

One particular problem involved in handling low D.E. starch hydrolysate liquids is their tendency to haze upon standing. Particularly the highly concentrated materials of this type having a concentration say within 40-80% solids by weight have a distinct tendency to haze even after only a minimal standing time. Yet, of course, it is a necessity from the commercial viewpoint to market highly concentrated syrups of this type. When the usual commercial products at around 5-20 D.E. are concentrated to around the solids content just set out, the syrups will become opaque and in many instances set up to an immobile gel. It is therefore essential from handling and aesthetic considerations to make the syrups non-hazing.

In view of the above it therefore becomes an object of the invention to provide a number of derivatives of low D.E. starch hydrolysates.

Another object of the invention is to provide derivatives of highly concentrated low D.E. starch hydrolysate syrups such as corn and milo syrups.

A still further object of the invention is to provide a method of preventing haze formation of highly concentrated low D.E. starch hydrolysate liquids by having present the above-mentioned derivatives.

A still further object of the invention is to prevent the above hazing problems by resort to a simple unique procedure involving only minimal cost. The resultant treated syrups have been found to remain non-hazing even over considerable periods of time.

Other objects will appear hereinafter.

BROAD DESCRIPTION OF THE INVENTION

In accordance with the invention a new class of derivatives has been discovered. Broadly described, these derivatives of low D.E. starch hydrolysates may either be of the cationic, anionic or nonionic type. That is, the parent low D.E. starch hydrolysate may be reacted with a variety of agents to introduce therein a positive, negative or neutral substituent group. In essence then, the hydrolysates are amenable to reacton with a host of inorganic and organic reactants as set out in more detail below.

The invention is also concerned with prevention of hazing in solutions of low D.E. starch hydrolysate solids such as corn and milo syrups. Haze formation in syrups of this type is particularly prevalent when the solutions are highly concentrated, say in the neighborhood of 40%–80% solids by weight. The non-hazing characteristic is obtained by having present the above derivatives. The derivatives may be introduced into the syrups from an external source, or the syrups themselves may be treated with various reagents and a portion of the syrups derivatized in this manner. Either mode of operation is admirably suited in carrying out the aims of the invention.

LOW D.E. STARCH HYDROLYSATES

The basic material used in practicing the invention is, of course, starch itself. The starches utilized may be derived from any vegetable source, such as, for example, corn, wheat, potato, tapicoa, rice, sago and grain sorghum. The waxy starches may be also used. The term "starch" is used broadly herein and encompasses unmodified starch and tailings, and, as well, starch that has been slightly modified by treatment with acids, alkalies, enzymes, etc. Soluble or partially soluble modified starches, pregelatinized products, etc. are also suitable for use in the process.

The low D.E. starch hydrolysate material formed from the above starchy materials is made by subjecting a source of starch to enzyme or acid treatment or a combination of both treatments. By proper adjustment of conditions it is possible to produce low D.E. (dextrose equivalent) of less than about 30, more preferably have a D.E. range of 10–30, and most preferably have a D.E. of 5–20.

The term "D.E." (dextrose equivalent) is used herein to refer to the reducing sugars content of the dissolved solids in a starch hydrolysate expressed as dextrose as measured by the Luc-Schoorl Method (NBS Circular C–440, page 195 as appearing in "Polarimetry, Saccharimetry and the Sugars." Authors: Frederick J. Bates and Assoc.).

The low D.E. starch hydrolysate syrup solutions are usually made in say about 30% concentrations, and concentrated up to about 40–80% solids by weight. In other instances the solutions are dried such as by resorting to spray-drying.

Generally in making the derivatives of the invention solution reactions are employed, although one can envision a reaction of a solid low D.E. starch hydrolysate, say with a gaseous or liquid reactant in absence of external solvent. It is greatly preferred, of course, that the derivatization takes place in liquid media, such as water. The derivatives can thereby be marketed in such form or again dried by conventional techniques and sold in solid form.

After syrups are derivatized to prevent haze formation as will be described in more detail hereinafter, they are generally concentrated to a solids concentration greater than about 40% by weight, and most often have a solids content of 40–80% by weight.

NON-IONIC LOW D.E. STARCH HYDROLYSATE DERIVATIVES

The first class of the derivatives of the invention may be generically defined as non-ionic low D.E. starch hydrolysates. That is, by reaction of the just described starch hydrolysates with various reagents of this type there is introduced into the starch hydrolysate molecules sides chains wherein a derivative is produced which has a net molecular electrical charge that is neutral. Typical members of this class are those reactants which introduce ether or ester linkages into the anhydroglucose units of the low D.E. starch hydrolysates.

The non-ionic derivatives of this class are best represented by the follow structural formula:

LOW D.E. STARCH HYDROLYSATE —O—R₁—Z where $R_1$ when present is of the class of alkylene, hydroxy alkylene, halogeno alkylene, aralkylene, cycloalkylene, and phenylene– Z is selected from the group consisting of:

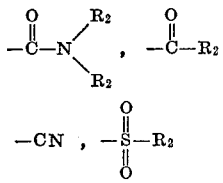

and where R is of the class of alkyl, aralkyl, alkenyl, hydrogen, cycloalkyl, hydroxyalkyl, halogeno alkyl, and cycloheteryl.

In preparing the just-defined compounds, the materials used to combine with the starch hydrolysates are in the main reagents which contain vinyl, anhydride, isocyanato, hydroxy vinyl, halogen, epoxy, etc. groups which are reative with the terminal hydroxy groups of the hydrolysates.

In the foregoing general Formula $R_1$ is the residue of the reactant which reacts with the hydroxy groups of the anhydroglucose units in the starch hydrolysates, and may be an alkylene, a hydroxy alkylene, an otherwise substituted alkylene, an aralkylene, a cycloalkylene, or a phenylene radical. Thus, $R_1$ may be methylene, ethylene, propylene, etc. The foregoing and other alkylene radicals may also have substituted thereon in one or more places a hydroxy, alkyl or aryl radical, or may be a cycloalkylene radical derived from, for example, cyclopropane, cyclobutane, and higher homologues. $R_1$ may also represent a phenylene radical and an alkyl or halo substituted phenylene radical. In some instances, depending upon the reactant employed, $R_1$ may be absent.

$R_2$ may be hydrogen or alkyl radicals as methyl, ethyl, n-propyl, t-butyl, heptyl, hexadecyl, and like alkyl radicals which may also be substituted with hydroxy, halo, alkyl or other substituents such as alkenyl radicals of allyl. Again, R may be cyclopropyl, cyclopentyl, as well as phenyl, alkyl, substituted phenyl and other cyclic groups. Further groups that may be represented by $R_2$ are morpholino, pyridyl, pyrrolidyl, furfuryl, imidazolidyl, imidazoly and the like.

The non-ionic starch hydrolysates of the invention may be conveniently prepared via a number of reactions, the following being typical. For sake of simplicity, the low D.E. starch hydrolysate reactant is depicted merely as LOW D.E. STARCH HYDROLYSATE OH. St below stands for the starch molecule portion of the product derivative, Typical derivatives formed as shown below are esters and amides.

Propionamide derivative

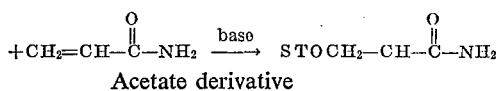

Acetate derivative

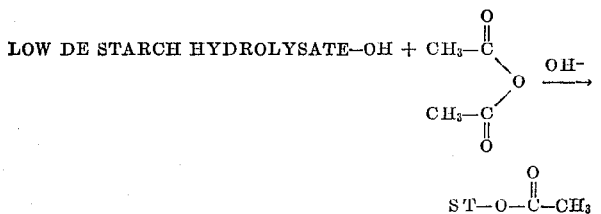

As can be seen from the above, this last enumerated derivative represents a situation where $R_1$ of of the general formula is absent. This is the general situation for example where esters are formed.

Other typical reactions are as follows:

Cyanoethyl derivative

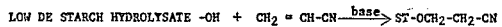

Toluenesulfonate derivative

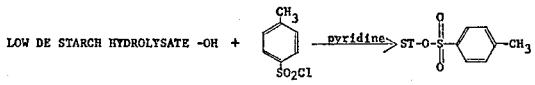

Carbanilate derivative

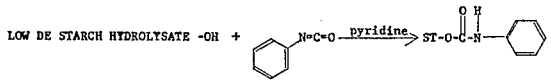

Methacrylate derivative

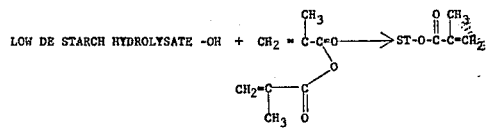

Allyl isocyanate derivative

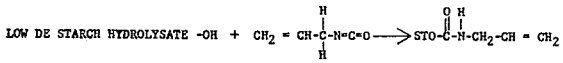

Benzoate ester derivative

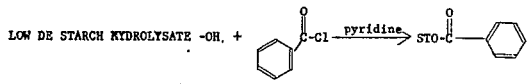

Preferred derivatives of this type are ester and amide derivatives of the low D.E. starch hydrolysates.

The just-described derivatives may have a D.S. (degree of substitution) ranging from a small but detectable amount up to about 3.0. That is, as is known, the anhydroglucose unit, of the type which is present in the starting low D.E. starch hydrolysate reactants, may be reacted with the just-enumerated reagents or others in varying degrees as expressed by the D.S. factor. In other words, the various hydroxyl groups of any particular anhydroglucose unit or monomer unit of the starch hydrolysate may be more or less substituted with side chains according to the amount of reagent employed, severity of reaction, reaction conditions, rate, etc.

According to the present belief in the art, the 6 position hydroxyl in any anhydroglucose unit is the most reactive. The hydroxyl at the 2 position is believed to be the next most reactive, and the hydroxyl at the 3 position is believed to be the least reactive. The present belief in the art presupposes that the 6 position hydroxyls in the anhydroglucose units will undergo more extensive substitution or addition than the hydroxyls at the 2 and 3 position but it may be otherwise. Irrespective of the actual sequence of the number of anhydroglucose units involved, substitution may occur with respect to the products of the invention to various degrees of substitution at all or less than all the anhydroglucose units. A number that is fractional, of course, reflects the fact that the D.S. figure represents a statistical average. In the usual situation the D.S. ranges from about 0.001 up to about 1.0, and most often ranges from about 0.01 up to about 0.1.

CATIONIC LOW D.E. STARCH HYDROLYSATE DERIVATIVES

The next class of the derivatives of the invention may be generically defined as cationic low D.E. starch hydrolysate derivatives. Here the starch hydrolysates are reacted with any reagent which thereby introduces a cationic-type of substituent into the molecule. That is through such reaction the starch hydrolysate derivative has thereby introduced into its structure a substituent possessing a positive electrical charge. Thus, any material may be employed which reacts with the hydroxy groups of the starch hydrolysate, thus introducing cationic character into the starch structure.

Again the starch hydrolysates may be cationically derivatized to any desired extent as set out above with respect to the non-ionic derivatives. That is, the D.S. may range from a small but detectable amount up to about 3.0. Again, in the usual situation the D.S. ranges from about 0.001 up to about 1.0 and most often ranges from about 0.01 up to about 0.1.

The term "cationic" is used here in its prior art sense, to characterize derivatives that migrate upon electrophoresis to the cathode. Thus, a cationic-type substituent is one that introduces a positive electrical charge into the molecule even though the net charge on the molecule is zero.

Particularly preferred cationic derivatives of the low D.E. starch hydrolysates may be represented by the following structural formula:

LOW D.E. STARCH HYDROLYSATE —O—Y where Y represents a radical depicted by the formula:

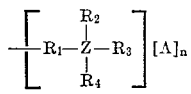

where $R_1$ is of the class of alkylene, hydroxy alkylene, halogeno alkylene, aralkylene, cycloalkylene, and phenylene; Z is of the class of sulfur, phosphorus and nitrogen; $R_2$, $R_3$ and $R_4$ individually are of the class of alkyl, aryl, aralkyl, hydrogen, cycloalkyl, hydroxyalkyl, halogeno alkyl and cycloheteryl; $R_2$, $R_3$ and $R_4$ when taken together with Z represents a heterocyclic ring structure; A is selected from the group consisting of an anion and an acid and $n$ is 1 or 0; with the further provisos that when Z is sulfur, $R_4$ is absent, none of $R_2$ and $R_3$ are hydrogen, $n$ is 1 and A is an anion; that when Z is nitrogen and at least one of $R_2$ and $R_3$ is hydrogen, then $R_4$ is absent and A when present is an acid; and that when Z is phosphorus, none of $R_2$, $R_3$ or $R_4$ are hydrogen, $n$ is one and A is an anion.

In preparing the just-defined compounds the molecules used to react with the starch hydrolysates are in the main reagents which contain in addition to the cationic proportion of the molecule carboxy, vinyl, halogen, or epoxy groups reactive with the hydroxy groups of the starch hydrolysates.

In the foregoing general formula, $R_1$ is the residue of the reactant which reacts with the hydroxyl groups of the anhydroglucose unit in the starch hydrolysate, and may be an alkylene, a hydroxy alkylene, an otherwise substituted alkylene, an aralkylene, a cycloalkylene, or a phenylene radical. Thus, $R_1$ may be methylene, ethylene, propylene, etc. The foregoing and other alkylene radicals also may have substituted thereon in one or more places a hydroxy, alkyl or aryl radical, cycloalkylene radicals derived from, for example, cyclopropane, cyclobutane and higher homologues. $R_1$ may also represent a phenylene radical and alkyl or halo substituted phenylene radicals. $R_2$, $R_3$ and $R_4$ may be hydrogen or alkyl radicals as methyl, ethyl, n-propyl, t-butyl, heptyl, hexadecyl, and like alkyl radicals which may also be substituted with hydroxy, halo, alkyl or other substituents. Again, $R_2$, $R_3$ and $R_4$ may be cyclopropyl, cyclopentyl, as well as phenyl, alkyl substituted phenyl and other cyclic groups. Further groups that may be represented by $R_2$, $R_3$ and $R_4$ are morpholino, pyridyl, pyrrolidyl, furfuryl, imidazolidyl and imidazolyl, and the like. Likewise, Z, $R_2$, $R_3$ and $R_4$ may be taken together to form a heterocyclic ring structure such as imidazoline and other known ring compounds.

When Z is sulfur, the products are sulfonium ether salts. When Z is phosphorus, the products are phosphonium ether salts. When Z is nitrogen, the products are either quaternary ammonium salts or may be primary, secondary, or tertiary amines or salts of the amines.

When Z is nitrogen, therefore, either or both of $R_2$ and $R_3$ may also be hydrogen, as well as one of those radicals mentioned above, and there may not be a substituent $R_4$. Thus, when either or both of $R_2$ and $R_3$ are hydrogen, $R_4$ is absent, $n$ is one or zero, and A when present is an inorganic or organic acid such as, for example, hydrochloric, hydrobromic, acetic, formic, oleic, stearic, benzoic, butyric, etc, whereby amine salts are represented. A may also be absent in this situation whereby primary, secondary and tertiary amines are depicted.

When Z is sulfur, $R_4$ is absent, none of $R_2$ and $R_3$ are hydrogen, $n$ is one, and A is an anion, so that the general formula above represents sulfonium salts.

When Z is phosphorus, then $n$ is one, none of $R_2$, $R_3$ and $R_4$ are hydrogen and A is an anion, so that the general formula represents phosphonium salts.

Thus, the cationic products of the invention may be the ammonium quaternary salts, or phosphonium, or sulfonium salts, or they may be the primary, secondary or tertiary amino ethers or salts thereof. Such amino ethers may serve usefully as intermediates to prepare the quaternary ammonium salts.

In preferred cationic derivatives, $R_2$ and $R_3$ represent hydrogen or alkyl radicals containing up to 18 carbon atoms, and $R_4$, when present, is also an alkyl radical of up to about 18 carbon atoms.

The cationic products of the invention include quaternary phosphorus ethers which are prepared, generally, by reacting the starch hydrolysates with quaternary phosphonium compounds. By means of this reaction phosphorus is then introduced into the starch material and is of a quaternary character. Preferred products of this type falling within the general structural formula are so defined in that the structure Y is represented by the following:

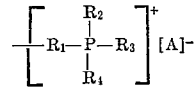

where $R_2$, $R_3$ and $R_4$ are alkyl groups up to about 18 carbon atoms, and A is an anion.

As just one example the starch hydrolysates may be reacted with a phosphonium etherification reagent such as 2-chloroethyl tributyl phosphonium chloride, obtained by reacting tributyl phosphine and 2-chloroethanol to obtain 2-hydroxyethyl tributyl phosphonium chloride. This latter product reacts with thionyl chloride to obtain the phosphonium etherification reagent.

The cationic-type substituents may also be sulfonium salts. Preferred materials of this type are again defined by reference to the group defined as Y in the above formula. Specifically products to the group defined as Y in the above formula. Specifically products of this type are characterized in that Y is represented by the following:

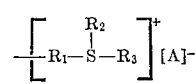

where $R_2$ and $R_3$ are alkyl groups up to about 18 carbon atoms, and A is an anion.

Various agents used to form the sulfonium starch polyether derivatives may include the halogeno alkyl sulfonium salt, the vinyl sulfonium salts and the epoxy alkyl sulfonium salts. The halogeno alkyl sulfonium salts may be dehydrated to form the vinyl sulfonium salts and the epoxy alkyl sulfonium salts may be obtained by epoxidation of an alkylene sulfonium salt. Specific reagents which may be mentioned here include 2-chloroethylmethylmethylethyl sulfonium iodide, beta-chloroethyl-methyl-[2-(ethylmethyl sulfonium) ethyl] sulfonium diiodide, methyl-cyclohexyl-chloroethyl sulfonium iodide, and the like.

Yet other products falling within the scope of the invention are those wherein Y is a nitrogen atom. Representative products of this type include nitrogen quaternaries wherein the Y radical from the general formula above is represented by the following:

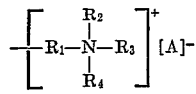

where $R_2$, $R_3$ and $R_4$ are as stated before, though in no instance are any of these radicals hydrogen. That is, in each instance there is a carbon to nitrogen bond to fulfill the quaternary structure. A in this instance is an anion. The most preferred products of this type are those wherein $R_2$, $R_3$ and $R_4$ are alkyl radicals containing up to 18 carbon atoms.

One typical way of preparing starch quaternary products is to react an epoxide form of a quaternary ammonium salt with the starch hydrolysate. The epoxide group then reacts with the hydroxyl groups of the starch hydrolysate. One way in which this can be done is by treating a chlorohydrin derivative with a strong alkali to convert it to the epoxide form. For example, N-(3-chloro-2-hydroxy propyl) trimethyl ammonium chloride may be treated with sodium hydroxide to obtain the N-(2,3-epoxypropyl) trimethyl ammonium chloride. The epoxy quaternary ammonium salt may also be prepared by first reacting trimethyl amine and epichlorohydrin. In this method it is preferred to remove any unreacted epichlorohydrin from the reaction product to prevent any cross-linking with the starch when the reaction product is used. This may be done by using vacuum evaporation or solvent extraction. The quaternary ammonium reagents reactive with the starch may have various types of alkyl and aryl substitutions of nitrogen to thereby introduce the various groups into the starch hydrolysates.

Still other products falling within the ambit of the present invention include tertiary, secondary and primary amino derivatives of starch where there are corresponding acid salts. Illustrative materials of this type are represented by the above structural formula where Y is depicted by the following structural formula:

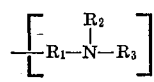

where $R_2$ and $R_3$ may represent any radical as set forth above including hydrogen. Preferably $R_2$ and $R_3$ are selected from the class of alkyl groups up to 18 carbon atoms and hydrogen.

Thus, for example, in order to form a tertiary amino derivative of the starch hydrolysate a suitable reagent such as a dialkylaminoalkyl halide or a dialkylaminoalkyl epoxide may be reacted with the starch base molecule. A representative dialkylaminoalkyl halide is 2-chloro-N-dimethyl-ethylamine, and a representative dialkylaminoalkyl epoxide is 3-dibutylamino 1,2 epoxy propane. After forming the tertiary amine derivative of the starch, suitable quaternaries thereof may also be synthesized by reacting the tertiary amino derivative with a reactant such as an alkyl halide, such as, for example, methyl iodide.

Amine salts may also be formed here by initially reacting an amine salt with the starch, or by reacting a primary, secondary or tertiary amine with the starch followed by salt formation. Products of this type are characterized in that Y is represented by the following:

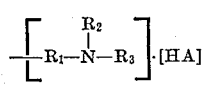

Again $R_2$ and $R_3$ are preferably alkyl groups containing up to about 18 carbon atoms or hydrogen. Here A is an anion of the acid addition compound whereby an acid amine salt is represented.

Primary amine derivatives of the starch hydrolysate may be easily formed by reacting the starch with acrylonitrile to obtain the cyanoethylated product, and then reducing this product to obtain the primary amine group as a terminal group. Again, the primary amine may be fully reacted with an alkyl halide to obtain secondary, tertiary and quaternary ammonium derivtives.

In some instances $R_2$, $R_3$ and $R_4$ may be taken together with Z whereby a heterocyclic ring is formed. Thus, for example, an aziridine molecule reactive with the starch hydrolysate may be so employed that under proper reaction condtions the ring is maintained during the synthetic reaction. Thus in the broad structural Formula Y may be selected from the group consisting of hydrogen and an ethyleniminyl radical. Preferred materials of this type are shown where Y is either hydrogen or is represented by the following formula:

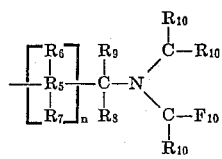

where $R_5$ is a radical selected from the group consisting of alkylene and alkenylene, the carbon atoms of said radical being substituted by groups represented by $R_6$ and $R_7$ which are selected from the group consisting of hydrogen, alkyl, cycloalkyl, substituted alkyl, alkenyl, alkanol, cycloheteryl, aralkyl, and aryl groups, $R_8$ is the same as $R_6$ and $R_7$, $R_9$ is a radical selected from the group consisting of hydrogen and hydroxy radicals, $R_{10}$ is a radical selected from the group consisting of hydrogen and lower alkyl radicals and $n$ represents an integer of at least one.

As a specific illustration of formation of an aziridinyl derivative, the starch hydrolysate may be reacted with N (1-hydroxy, 2,3 epoxypropyl) aziridine. The product obtained in this reaction is one wherein Y is

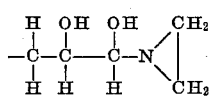

Still other ways of producing starch hydrolysates having terminal aziridine groups includes a preparative technique involving first mildly oxidizing the starch containing some carbonyl character such as keto or aldehyde groups, followed by further reaction of the carbonyl starch with ethylenimine or substituted ethylenimines under alkaline conditions. Thus, a starch aldehyde may be reacted with ethylenimine, propylenimine or substituted imines of this type.

Again another typical synthesis in this area involves reaction of N (4-chloro, 2-butenyl) aziridine with the starch. The halo group reacts with the terminal hydroxy groups of the starch to thereby introduce the aziridinyl radical into the starch material.

ANIONIC LOW D.E. STARCH HYDROLYSATE DERIVATIVES

Again, the low D.E. starch hydrolysates may be reacted with molecules which introduce an anionic-type of substituent into the starting starch material. Through this reaction the starch derivative has thereby introduced into its structure a substituent possessing a negative electrical charge. Thus, any material may be employed which reacts with the hydroxy groups of the starch hydrolysates, thus introducing anionic character into the starch structure. As mentioned above, the starch hydrolysates may be anionically derivatized to any desired extent just as with respect to those derivatives of the cationic and non-ionic type.

Greatly preferred anionic starch hydrolysates have the following structural formula:

LOW D.E. STARCH HYDROLYSATE
—O—[X]$^-$[M]$^+$ where X is an acid residue and M represents a cation. M may represent any cation, organic or metallic, such as, for example, sodium, calcium, potassium, magnesium, lithium, quaternary ammonium, hydrogen and the like.

In general, any acid, organic or inorganic which is reactive with the starch hydrolysates, and imparts anionic character into their molecular structure is useful in the invention. Thus, X may represent any organic or inorganic acid residue or portion of an acid reactant now attached to the starch molecule.

Thus, for example, the starch hydrolysates may be sulfated to form starch hydrolysate sulfate esters. Usually in this reaction the starch is sulfated with organic complexes of sulfur dioxide. Such complexing agents as pyridine, poly(2-vinyl pyridine), triethylamine, trimethylamine, etc. are utilized. In such cases then X represents $SO_3$.

In like manner, the starch hydrolysates thereof may be phosphated with materials such as condensed phosphoric acid. Tripolyphosphoric acid as well as the sodium salt thereof may be utilized here. The starch molecule may also be phosphated with a mixture of sodium mono- and dihydrogen orthophosphates, as well as with pyrophosphate or orthophosphate. Representative phosphorus-containing groups attached to the starch through an ester-type bond may be depicted where X is $PO_3H$ or $PO_3Na$. In these cases M may again be any cation, and in the usual case represents Na.

In essence, the invention encompasses any low D.E. starch hydrolysate base molecule as described above which additionally contains a sulfur or phosphorus group or any other radical which thereby imparts an anionic character to the formerly non-ionic starch hydrolysate.

Other preferred anionic starch derivatives of the invention may be represented by the following general formula:

{R''—X}$^-$[M]$^+$ where R''—X represents the residue of an organic acid which has reacted with the starch hydrolysate, and M again represents a cation.

More specifically, in the foregoing general formula, R'' is an alkylene, hydroxy alkylene, halogeno alkylene, cycloalkylene, an aralkylene, or an otherwise substituted alkylene radical previously constituting the hydrophobic portion of the organic acid reactant; X represents any organic acid group such as, for example, substituted phosphoric, phosphonic, phosphinic, sulfonic, sulfinic, or carbonyl; and M is an organic or a metallic cation as set out above. Thus, R'' may be methylene, ethylene, propylene, etc. The foregoing and other alkylene radicals also may have substituted thereon in one or more places a hydroxy, alkyl or aryl radical, cycloalkylene radicals derived from, for example, cyclopropane, cyclobutane and higher homologues. R'' may also represent a phenylene radical and alkyl or halo substituted phenylene radicals.

The anionic or acid group has the effect of introducing into the starch molecule a negative electrical charge. The presence of such a charge is frequently detectable by electrophoresis and by known dye staining techniques. However, these detection methods indicate net molecular electric charge rather than, necessarily, the charge introduced by any particular substituent. The net charge on a molecule of a starch polyether derivative of this invention is not necessarily negative. Rather, the molecule may exhibit a response to electrophoresis that is characteristic of either a positive, negative, amphoteric or neutral molecule. Nevertheless, the derivatives of this invention are referred to as anionic derivatives, as is customary in the art, or as derivatives that contain an anionic-type substituent.

The anionic starch derivatives of this invention are generally prepared by reacting the starch with a reagent that introduces an anionic-type substituent into the starch molecule. Representative derivatives, so produced, would include, for example, such ethers as the alkyl sulfonic ethers; aralkyl sulfonic ethers; alkyl carboxy ethers; aralkyl carboxy ethers; phosphonic ethers; phosphinic ethers; sulfinic ethers, and the like.

For example, in order to prepare starch derivatives that contain a sulfonic group as the anion-type substituent, the polyether is reacted with a sultone reactant. Such a reactant may be represented as follows:

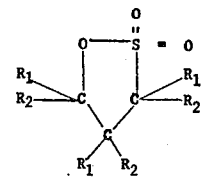

where $R_1$ and $R_2$ may be the same or different, and are hydrogen or alkyl. For example, where $R_1$ and $R_2$ are hydrogen, the resulting propane sultone is reacted with the starch hydrolysate to form the sulfopropyl ether derivative.

The sulfonic alkyl ethers may also be obtained by reacting a halogeno alkyl sulfonate, such as, for example, sodium 2-chloroethane sulfonate with the starch hydrolysate.

The carboxy alkyl anionic derivatives may be obtained, for example, by reacting the starch with a halogenated carboxylic acid such as chloroacetic acid or its salts; with a lactone such as $\beta$-propiolactone; or with an ethylenically unsaturated amide such as acrylamide, methacrylamide, etc. followed by the step of hydrolyzing the resulting amide group, such as the propionamide group. The carboxy alkyl ether products may also be obtained by reacting the starch with an ethylenically unsaturated nitrile such as acrylonitrile, to obtain the cyanoethylated product, and then hydroyzing this product to obtain the carboxy ethyl ether.

Among specific organic acid radicals that can be reacted with the starch hydrolysates, the following are useful in the formation of derivatives with interesting properties, in addition to those previously identified either generally or specifically. They are identified, for convenience, in the acid form, unreacted with the starch:

epoxycarboxylic acid
$\alpha$-halocarboxylic acid
alkanephosphorus acid—R''P(OH)$_2$
dialkylphosphinous acid—R''$_2$POH
alkanephosphonic acid—R''PO$_3$H$_2$
dialkylphosphinic acid—R''$_2$PO$_2$H
alkanethiophosphonic acid—R''PS(OH)$_2$
dialkylthiophosphinic acid—R''$_2$POS(OH)
alkylsulfonic acid—R''SO$_3$H The alkyl group represented by R'' above may be methyl, ethyl, n-propyl, i-propyl, butyl, heptyl, hexyl, hexadecyl, hendecyl, dodecyl, etc. Generally, the corresponding aryl, cycloalkyl, and cycloheteryl acid radicals may also be etherified, in addition to the alkyl compounds referred to above.

Thus, in summary, when organic acids are used to react with starch hydroysates X may represent such groups as —$SO_3$— and —COO— which are attached to the organic portion of the molecule depicted above as R''.

The following examples illustrate preparations of typical low D.E. derivatives of the invention.

EXAMPLE I

Acetylated low D.E. starch hydrolysate

Corn starch was hydrolyzed in the conventional manner. The resulting low D.E. starch hydrolysate had about a 17 D.E.

A 30% solids solution of the above syrup was adjusted to pH 8.0 using 2 N sodium hydroxide. At room temperature 5.1 grams of acetic anhydride was added dropwise while maintaining the pH at about 8.0 by continuous addition of 2 N sodium hydroxide. The resultant product had a D.S. of 0.05.

EXAMPLE II

Sulfopropyl ether derivative of low D.E. starch hydrolysate 1 mole (162 grams, dry basis) of a 11 D.E. corn syrup was dissolved in 300 ml. of water. To this was added 0.06 mole of sodium hydroxide and 0.05 mole of propane sultone. The solution was stirred overnight at 50° C. During the reaction the pH dropped from 11.3 to 6.4. The product had a D.S. of 0.05.

Prevention of haze in low D.E. starch hydrolysates

As noted above, there is a particular problem of haze formation in highly concentrated low D.E. starch hydrolysates which exist in syrup or liquid form. We have discovered that this problem can be overcome by having present in these syrups at least an effective amount of any of the derivatives described above. Effectiveness has been found with respect to non-ionic, anionic, or cationic derivatives of the low D.E. starch hydrolysate products.

This problem may be solved in a number of ways. For example, derivatives may be prepared as described above, and added to the low D.E. starch syrups.

If a low D.E. starch hydrolysate derivative is added to the low D.E. starch hydrolystate syrup generally 1–10 parts of the derivative having a D.S. ranging from about 0.01 to about 0.1 are mixed with 1–10 parts of the underivatized starch hydrolysate having a tendency to haze unless otherwise treated.

By far the simplest, most practical and most economical method of preventing haze formation in the highly concentrated syrups is to actually derivatize the syrup itself. Usually, the derivatization is carried out by reacting the low D.E. syrups in a less concentrated form, and then concentrating up to the desired solids level. Thus, any type of reaction as described above wherein non-ionic, anionic or cationic substituents are introduced into the starch hydrolysate solids of the syrups may be carried out. Usually the solids concentration of the syrups undergoing reaction ranges from about 10 to about 40% by weight. Then the derivatized syrups are concentrated to a solids content greater than 40% and usually within the range of 40–80% by weight of starch solids. When this embodiment of the invention is carried out usually the low D.E. syrups are derivatized to a D.E. ranging from about 0.01 up to about 0.1. One can also derivatize them to a higher extent. However, good results are obtained within the aforementioned range and carrying out the reaction to a further extent merely adds to the cost factor.

It was interesting to note that actual derivatives must be made in order to realize the benefit of haze retardation. It was first thought that perhaps that merely the presence of a salt was the factor involved. To investigate this premise, 0.05 mole of sodium acetate was added to a 11 D.E. white milo starch hydrolysate. The thus treated syrup behaved the same as the control with respect to the haze phenomenon. That is, the addition of sodium acetate in no way retarded the hazing of the treated low D.E. starch hydrolysate.

The following work illustrates the efficacy of the invention. Specifically, various samples of low D.E. starch hydrolysates were derivatized with both acetic anhydride and propane sultone in the manner shown in the above examples. With respect to reaction of the starch hydrolysate with acetic anhydride a number of runs were made at different ratios of the moles of acetic anhydride per mole of anhydroglucose unit of the starch hydrolysate. In addition, both corn and waxy milo starch hydrolysates of varying low D.E.'s were reacted with the acetic anhydride.

With respect to the sulfopropyl ether derivative of the low D.E. starch hydrolysate as prepared in Example II, the derivative was first concentrated to a 50% syrup solids. The syrup remained free of haze for three days compared to haze formation in about 2 hours for the control or non-treated syrup.

Table I below shows that derivatizing various low D.E. starch hydrolysate syrups with acetic anhydride in varying molar proportions measurably reduced haze formation upon standing compared to the control. Results are given below.

TABLE I.—EFFECT OF ACETYLATION ON HAZE FORMATION IN LOW D.E. STARCH HYDROLYSATE SYRUPS

| Starch hydrolysate | Acetic anhydride mole/mole anhydroglucose unit | Haze formation (days) | | | |
| --- | --- | --- | --- | --- | --- |
| | | Clear | Slight | Medium | Opaque |
| Corn 16–18 D.E. (50% syrup solids). | None (control) | | 1 hr | 5 hr | 1 |
| | 0.03 | | | 7 hr | 3 |
| | 0.04 | | | 2 | 7 |
| | 0.05 | | 1 | 6 | 8 |
| Corn 11–12 D.E. (60% syrup solids). | None (control) | | | | 1 |
| | 0.03 | | 3 | 5 | 7 |
| | 0.04 | | 4 | 7 | 11 |
| | 0.05 | 8 | 9 | 12 | 15 |
| | 0.10 | 120 | | | |
| Waxy milo 11–12 D.E. (60% syrup solids). | None (control) | 1 | | 2 | 5 |
| | 0.01 | 2 | 3 | 5 | 6 |
| | 0.02 | 4 | 5 | 9 | 11 |
| | 0.03 | 7 | 10 | 16 | 18 |
| | 0.04 | 15 | 16 | 25 | 28 |
| | 0.05 | 35 | 39 | 46 | 53 |

The products described above and other members of this type are available for a broad number of applications. Due to their versatility of structure, differing terminal groups, etc. they may be tailored to fit any particular use-application. They are found particularly useful as components in formulations for forming films, coatings, resins, modified polymers, sizes, plasticizers, binders, adhesives, etc. In such instances they may form either a portion of the total additive or be used per se without modification or formulation with other materials. As other examples, they may be used in the casting industry, as thickeners, as flame retardants, as paper additives, for example, to increase strength and pigment retention, as textile treating aids such as to increase water, oil and crease resistance, etc. Other uses will be evident to those having skill in the art of utilizing in some manner high molecular weight materials of the type just set out.

The just described derivatives are particularly useful in treating a wide variety of cellulosic fibrous materials to improve their properties. Illustrative of these are textiles and other cellulosic derivative materials such as paper. Thus, the products of the invention may be used to size both paper articles and yarns, and as well may even be used to finish off already woven textile materials. Fiber treatment with these compositions imparts substantially improved strength to the fiber strands, which can be thus woven in due course without fear of fiber breakage. Again the compositions may be employed to treat both synthetic and natural fibers, or combinations of these, such as rayon, nylon, acrylics, polyesters, cotton, wool etc.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A substantially haze-free, high solids, low D.E. starch hydrolysate syrup which comprises a low D.E. starch hydrolysate derivative having a D.E. from about 5 to about 20, and a D.S. greater than about 0.01, and is selected from the group consisting of:
   (1) anonionic derivative of the structural formula:
       low D.E. starch hydrolysate —O—$R_1$—Z where $R_1$ when present is of the class of alkylene, hydroxyl alkylene, halogeno alkylene, aralkylene, cycloalkylene, and phenylene, and Z is

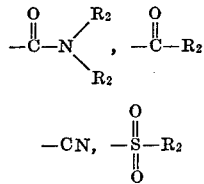

where $R_2$ is of the class of alkyl, aralkyl, alkenyl, hydrogen, cycloalkyl, hydroxyalkyl, halogeno alkyl, and cycloheteryl;
   (2) a cationic derivative of the structural formula:
       low D.E. starch hydrolysate —O—Y where Y is

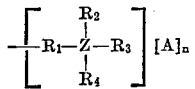

where $R_1$ is of the class of alkylene, hydroxy alkylene, halogeno alkylene, aralkylene, cycloalkylene, and phenylene; Z is of the class of sulfur, phosphorus and nitrogen; $R_2$, $R_3$ and $R_4$ individually are of the class of alkyl, aryl, aralkyl, hydrogen, cycloalkyl, hydroxyalkyl, halogeno alkyl and cycloheteryl; A is an anion; and $n$ is 1 or 0; with the further provisos that when Z is sulfur, $R_4$ is absent, none of $R_2$ and $R_3$ are hydrogen $n$ is 1 and A anion; that when Z is nitrogen and at least one of $R_2$ and $R_3$ is hydrogen, then $R_4$ is absent and A when present is an acid; and that when Z is phosphorus, none of $R_2$, $R_3$ or $R_4$ are hydrogen, $n$ is one and A is an anion; and
   (3) an anionic derivative of the structural formula:
       low D.E. starch hydrolysate

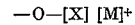

where X is an organic acid residue and M is a metallic or organic cation; and said syrup having a solids content from about 40% to about 80%.

2. A syrup as in claim 1, having a D.S. from about 0.01 to about 0.1.

3. A syrup in accordance with claim 1, wherein the low D.E. starch hydrolysate derivative is a low D.E. starch hydrolysate acetate.

4. A syrup in accordance with claim 1, wherein the low D.E. starch hydrolysate derivative is a sulfopropyl ether derivative.

References Cited
UNITED STATES PATENTS

| | | | |
|---|---|---|---|
| 2,801,242 | 7/1957 | Kerr | 260—233.5 |
| 2,938,026 | 5/1960 | Stephens et al. | 260—233.3 |
| 2,965,520 | 12/1960 | Snyder et al. | 127—38 |
| 2,989,520 | 6/1961 | Ruthenburg et al. | 260—233.3 |
| 3,033,852 | 5/1962 | Paschall | 260—233.3 |
| 3,035,045 | 5/1962 | Trimnell et al. | 260—233.3 |
| 3,046,272 | 7/1962 | Strating et al. | 260—233.3 |
| 3,057,855 | 10/1962 | Smith et al. | 260—233.5 |
| 3,069,410 | 12/1962 | Smith et al. | 260—233.3 |
| 3,070,595 | 12/1962 | Petracek et al. | 260—234 |
| 3,077,469 | 2/1963 | Aszalos | 260—233.3 |
| 3,169,083 | 2/1965 | Taylor | 127—71 |
| 3,208,998 | 9/1965 | Fisher et al. | 260—233.3 |
| 3,243,426 | 3/1966 | Caesar | 260—233.3 |
| 3,318,868 | 5/1967 | Evans et al. | 260—233.5 |
| 3,352,848 | 11/1967 | Christoffel et al. | 260—209 |
| 3,388,120 | 6/1968 | Lotzgesell et al. | 260—233.3 |
| 3,449,322 | 6/1969 | Elizer | 260—233.3 |
| 3,464,974 | 9/1969 | Gramera | 260—233.3 |
| 3,467,647 | 9/1969 | Benninga | 260—209 |

OTHER REFERENCES

Wurzburg; Methods in Carbohydrate Chemistry, Whistler ed., Academic Press, N.Y., 1964, vol. 4, pp. 286–288.

DONALD E. CZAJA, Primary Examiner

M. I. MARQUIS, Assistant Examiner

U.S. Cl. X.R.

106—213 R; 117—139.5 C, 143 R; 127—32 R, 38 R, 70 R; 260—9 R, 233.5 R

PO-1050
(5/69)

UNITED STATES PATENT OFFICE
CERTIFICATE OF CORRECTION

Patent No. __3,639,389__ Dated __February 1, 1972__

Inventor(s) __Glenn Arden Hull__

It is certified that error appears in the above-identified patent and that said Letters Patent are hereby corrected as shown below:

Column 1, line 59, "simple unique" should read --simple yet unique--;

Column 1, line 72, "a variety" should read --a wide variety--;

Column 2, line 2, "reacton" should read --reaction--;

Column 2, line 34, after "low D.E." add --starch hydrolysates which have a relatively low D.E.--;

Column 2, line 42, "Luc" should read --Luff--;

Column 2, line 48, "80%" should read --60%--;

Column 3, line 6, "follow" should read --following--;

Column 3, line 21, "R" should read --$R_2$--;

Column 3, line 28, "ative" should read --active--;

Column 3, line 46, "of" should read --or--;

Column 3, line 47, "R" should read --$R_2$--;

Column 3, line 51, "dazoly" should read --dazolyl--;

Column 4, line 2, delete "of";

Column 6, line 56, delete "Specifically products to the group defined in Y in the above formula";

Column 8, line 9, "derivtives" should read --derivatives--;

Continued

UNITED STATES PATENT OFFICE
CERTIFICATE OF CORRECTION

PO-1050
(5/69)

Patent No. 3,639,389        Dated February 1, 1972

Inventor(s) Glenn Arden Hull       PAGE - 2

It is certified that error appears in the above-identified patent and that said Letters Patent are hereby corrected as shown below:

Column 8, in the first formula "$F_{10}$" should read --$R_{10}$--;

Column 8, line 49, after the word "starch" add --to produce a starch--;

Column 9, line 54, "bonyl" should read --boxyl--;

Column 10, line 39 "hydroyzing" should read --hydrolyzing--;

Column 11, line 2, "N" should be --$\underline{N}$--;

Column 11, line 5, "N" should be --$\underline{N}$--;

Column 13, in Claim 1, "(1) anonionic" should read --(1) a nonionic--;

Signed and sealed this 8th day of August 1972.

(SEAL)
Attest:

EDWARD M. FLETCHER, JR.
Attesting Officer

ROBERT GOTTSCHALK
Commissioner of Patents